(No Model.)

B. B. BARNETT.
MACHINE FOR BORING AND DRILLING.

No. 403,240. Patented May 14, 1889.

Witnesses:
E. P. Ellis,
Allen S. Pattison

Inventor
Barnard B. Barnett,
per
J. A. Lehmann,
Atty.

UNITED STATES PATENT OFFICE.

BARNARD B. BARNETT, OF WOODRUFF'S, SOUTH CAROLINA.

MACHINE FOR BORING AND DRILLING.

SPECIFICATION forming part of Letters Patent No. 403,240, dated May 14, 1889.

Application filed January 14, 1889. Serial No. 296,266. (No model.)

*To all whom it may concern:*

Be it known that I, BARNARD B. BARNETT, of Woodruff's, in the county of Spartanburg and State of South Carolina, have invented certain new and useful Improvements in Boring and Drilling Machines; and I do hereby declare the following to be a full, clear, and exact description of the invention, such as will enable others skilled in the art to which it pertains to make and use it, reference being had to the accompanying drawings, which form part of this specification.

My invention relates to an improvement in machines for boring and drilling; and it consists in the combination of a suitable frame-work, clamps placed upon this frame-work for holding the object to be bored or drilled, the drill-shaft, which is to be operated by a common brace or other means, and the feeding mechanism by which the drill or boring-tool is fed forward, all of which will be more fully described hereinafter.

The object of my invention is to produce a portable machine which is adapted for either boring or drilling, and which will hold the work which is to be operated upon, and in which the drill or boring-bit is operated by a common brace or other means.

Figure 1:
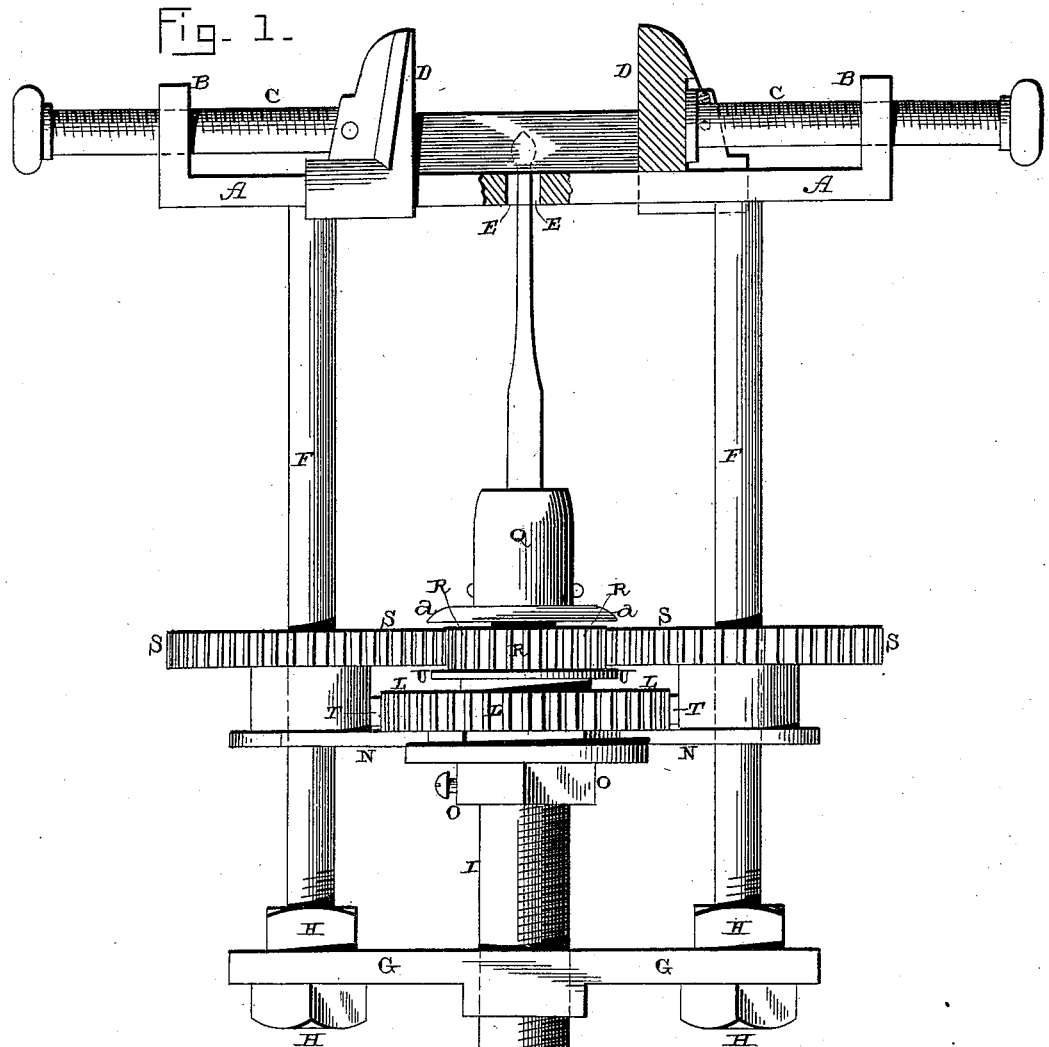
Figure 2:
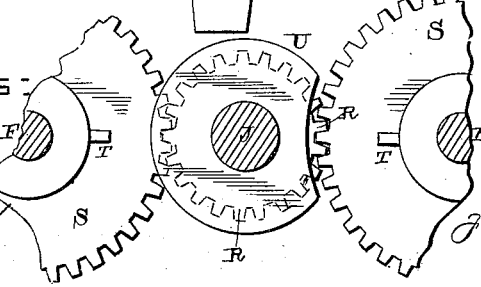

In the accompanying drawings, Figure 1 represents a plan view of a machine which embodies my invention, shown partly in section. Fig. 2 is a detail.

A represents the end piece of the frame-work, which has its ends B turned outward and provided with threaded openings. Through these openings pass the screw-rods C, which are swiveled in any suitable manner at their inner ends to the two jaws D of the clamp. By turning these screw-rods the jaws can be moved back and forth and thus made to clamp the object which is to be operated upon by the drill or bit. Through this end piece A, in between the two jaws of the clamp, is an opening, E, through which the end of the drill or bit passes, so as to operate upon the work. By this construction the work can be held securely without the help of any other means.

In case it is desired to bore or drill a hole in a boiler or other large object which cannot be caught between the jaws, a rod or bar having a hole through it to correspond with the one E is to be fastened to the work, and then my boring and drill machine will be clamped to the rod and the drill will operate through the hole in the rod or bar.

Secured rigidly to this end piece A are the two guide-rods F, which have their outer ends secured rigidly together by the end piece G, which is held between the clamping-nuts H, placed upon the screw-threaded ends of the rod. The end piece G has a screw-threaded opening made through its center, and through this opening the threaded sleeve I passes, and which sleeve serves as a guide for the drill-rod J. The inner end of the sleeve I is supported by the sliding cross-piece N, and to the inner end of the sleeve is secured the gear-wheel L. Upon the sleeve I is placed the clamping-nut O, which serves to clamp the cross-piece N tightly against the wheel L, and thus cause this cross-piece to move only with the sleeve. The wheel L is rigidly secured to the end of the sleeve, so as to revolve with it, and the cross-piece N, through which the sleeve freely passes, serves as a support for it and freely moves back and forth upon the rods F as the sleeve is moved endwise. The screw simply serves to keep the cross-piece in contact with the wheel, so as to prevent them from being separated as the sleeve is moved endwise. The drill-rod revolves freely through the sleeve without affecting it in any manner.

In order to cause the drill-rod to be fed forward only at the same rate of speed as the sleeve, a sleeve or ring, P, is passed around the outer end of the drill-rod and is secured thereto by means of a set-screw. This ring P revolves with the drill-rod, but has no other effect than to prevent the drill-rod from moving forward more rapidly than the sleeve I. To the inner end of the drill-rod is secured a suitable device, Q, for holding the drill or bit, and just in the rear of the device Q is the pinion R, rigidly secured to the shaft, and which meshes with and operates the two sliding gear-wheels S, placed upon the guide-rods F. Upon the inner end of the device Q is formed a flange, *a*, which is wider than the pinion R and catches in front of the wheels S to prevent them from being forced forward on the rods F and getting out of contact with the pinion. The pinion can be forced forward of the two wheels S; but the wheels cannot be forced in advance of the pinions. These wheels S revolve freely upon the rods, and have their hubs provided with any suitable number of spurs or projections T, which mesh with the wheel L, and thus cause it to turn and operate the sleeve I, for the purpose of moving the drill-rod either forward or back. The rapidity with which the hollow sleeve is moved forward depends upon the number of these projections T, which are arranged upon both of the hubs so as to strike the wheel L at the same time. Should it not be desired to have the feed mechanism brought into play, it is only necessary to force the drill-rod forward so that the projections T will not strike the wheel L, and then the drill or bit can be made to rapidly revolve by means of the brace which is applied to its end.

The pinion R is provided with a flange, U, upon its inner edge, and this flange catches behind the edges of the two wheels S, so that when the drill-rod is forced forward without the help of the feeding mechanism the wheels S will be moved forward on the rods F at the same time. By this movement the feed mechanism is instantly thrown out of gear, which can only be done when the ring P is removed from the outer end of the drill-rod, so as to leave it free to be moved back and forth independently of the sleeve I. The flange upon the pinion R is cut away upon one side, so that when it is desired to operate the drill-rod independently of everything else it is only necessary to turn this cut-away portion of the flange toward one of the wheels S and push the rod forward, when it can be instantly detached from that wheel toward which this cut-away portion is turned, as shown in Fig. 2, but not from the other wheel S, which is moved forward with the pinion. When one has been released, the other can be released in the same way by turning the cut-away part of the flange toward it and then forcing forward on the drill-rod. Thus it will be seen that the drill-rod can be operated entirely by itself, or with the two wheels S, or with the wheels S and the feeding mechanism, just as may be desired.

This machine being portable, it is useful in drilling holes in things where they stand, and which would be inconvenient to move to a common drill-press. It is also adapted for drilling holes in small objects which would be difficult to confine in the common drill-press. By making the hole E in the end piece A large enough to receive the end of a spoke, and by increasing the number of projections T upon the hubs of the wheel S, so as to give a quicker feed, this machine can be made to form tenons on the ends of spokes. This machine is also adapted to be used as a stationary drill; or it can be moved about and applied to objects wherever they are, just as may be desired.

In case it is so desired, the jaws for holding the work may be operated by a single screw, as in a vise, in which case one of the jaws will be stationary and the other movable. I do not limit myself to any particular method of operating the jaws, for this may be varied at will.

Having thus described my invention, I claim—

1. The combination of the guide-rods F of the frame, the end piece G, for securing their ends together, the sleeve I, the wheel L, secured to the end of the sleeve, a cross-piece, N, the wheels S, provided with projections for operating the wheel L, and the drill-shaft provided with a pinion for operating the wheels S, substantially as specified.

2. The combination of the frame composed of the two end pieces and the two guiding-rods which connect the end pieces together, the drill-rod, a sleeve through which the rod passes, a pinion upon the rod, and the intermediate operating-wheels for feeding the screw-threaded sleeve forward, substantially as shown.

In testimony whereof I affix my signature in presence of two witnesses.

BARNARD B. BARNETT.

Witnesses:
C. M. MILLER,
W. H. BALL.